(12) United States Patent  
Sano

(10) Patent No.: US 7,667,177 B2  
(45) Date of Patent: Feb. 23, 2010

(54) READING CIRCUIT, DISPLAY PANEL AND ELECTRONIC SYSTEM UTILIZING THE SAME

(75) Inventor: Keiichi Sano, Taipei (TW)

(73) Assignee: TPO Displays Corp., Miao-Li (TW)

( * ) Notice: Subject to any disclaimer, the term of this patent is extended or adjusted under 35 U.S.C. 154(b) by 68 days.

(21) Appl. No.: 11/779,912

(22) Filed: Jul. 19, 2007

(65) Prior Publication Data

US 2009/0020686 A1 Jan. 22, 2009

(51) Int. Cl.
*H01J 40/14* (2006.01)
*H01L 27/00* (2006.01)

(52) U.S. Cl. .................. 250/208.1; 250/214 C; 345/175; 349/42; 348/308

(58) Field of Classification Search .......... 250/208.1, 250/214 R, 214 C; 345/173, 175; 349/24, 349/42; 348/308

See application file for complete search history.

(56) References Cited

U.S. PATENT DOCUMENTS

| 2006/0092143 | A1* | 5/2006 | Kasai et al. ............... 345/175 |
| 2007/0046593 | A1* | 3/2007 | Shin ............................ 345/81 |
| 2007/0109286 | A1* | 5/2007 | Nakamura et al. ........ 345/204 |
| 2009/0021627 | A1* | 1/2009 | Fossum ..................... 348/308 |

FOREIGN PATENT DOCUMENTS

| JP | 2001264014 | 9/2001 |
| JP | 2004318819 | 11/2004 |
| JP | 2005328352 | 11/2005 |

\* cited by examiner

*Primary Examiner*—Kevin Pyo
(74) *Attorney, Agent, or Firm*—Thomas, Kayden, Horstemeyer & Risley

(57) ABSTRACT

A reading circuit including a detection module, a first transistor, and a compensation module is disclosed. The detection module detects a light. The first transistor transforms the detection result for generating a current signal. The compensation module compensates a threshold voltage of the first transistor.

15 Claims, 4 Drawing Sheets

READING CIRCUIT, DISPLAY PANEL AND ELECTRONIC SYSTEM UTILIZING THE SAME

BACKGROUND OF THE INVENTION

1. Field of the Invention

The invention relates to a reading circuit, and more particularly to a reading circuit for obtaining the intensity of a light.

2. Description of the Related Art

With the development of technology, input devices for electronic products have achieved great diversity. In various input devices, touch panels are widely used in the display arrays of liquid crystal displays (LCDs), thus, the capability to input data via the display panel of an LCD. When touch panels are utilized for data input, conventional input devices, such as keyboards and mice, are eliminated, thus, usable space is increased. In various electronic products, such as a personal digital assistant (PDA), a notebook computer (NB), a personal computer (PC), and a mobile phone, touch panels are served main input devices and gradually replace the conventional input device Because the number of communication and electronic products has increased substantially and because products frequently utilize touch panels as input devices, much research has been devoted to touch panel contact techniques. The response method of the touch panel comprises a photo detection method utilizing a sensor produced by a low temperature poly-si (LTPS) technique. Because the sensitivity of the sensor is lower, a thin film transistor (TFT) is utilized to read the detected result provided by the sensor.

TFTs in different positions, however, have different threshold voltages due to manufacturing procedures. When two sensors detect lights having the same intensity, the TFTs are not able to provide the same reading result due to the different threshold voltages.

BRIEF SUMMARY OF THE INVENTION

An exemplary embodiment of a reading circuit comprises a detection module, a first transistor, and a compensation module. The detection module detects a light. The first transistor transforms the detection result for generating a current signal. The compensation module compensates a threshold voltage of the first transistor.

Electronic systems are also provided. An exemplary embodiment of an electronic system comprises a display panel comprising a pixel unit and a reading circuit. The pixel unit is coupled to a data line and a scan line. The reading circuit comprises a detection module, a first transistor, and a compensation module. The detection module detects a light. The first transistor transforms the detection result for generating a current signal to the data line. The compensation module compensates a threshold voltage of the first transistor.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
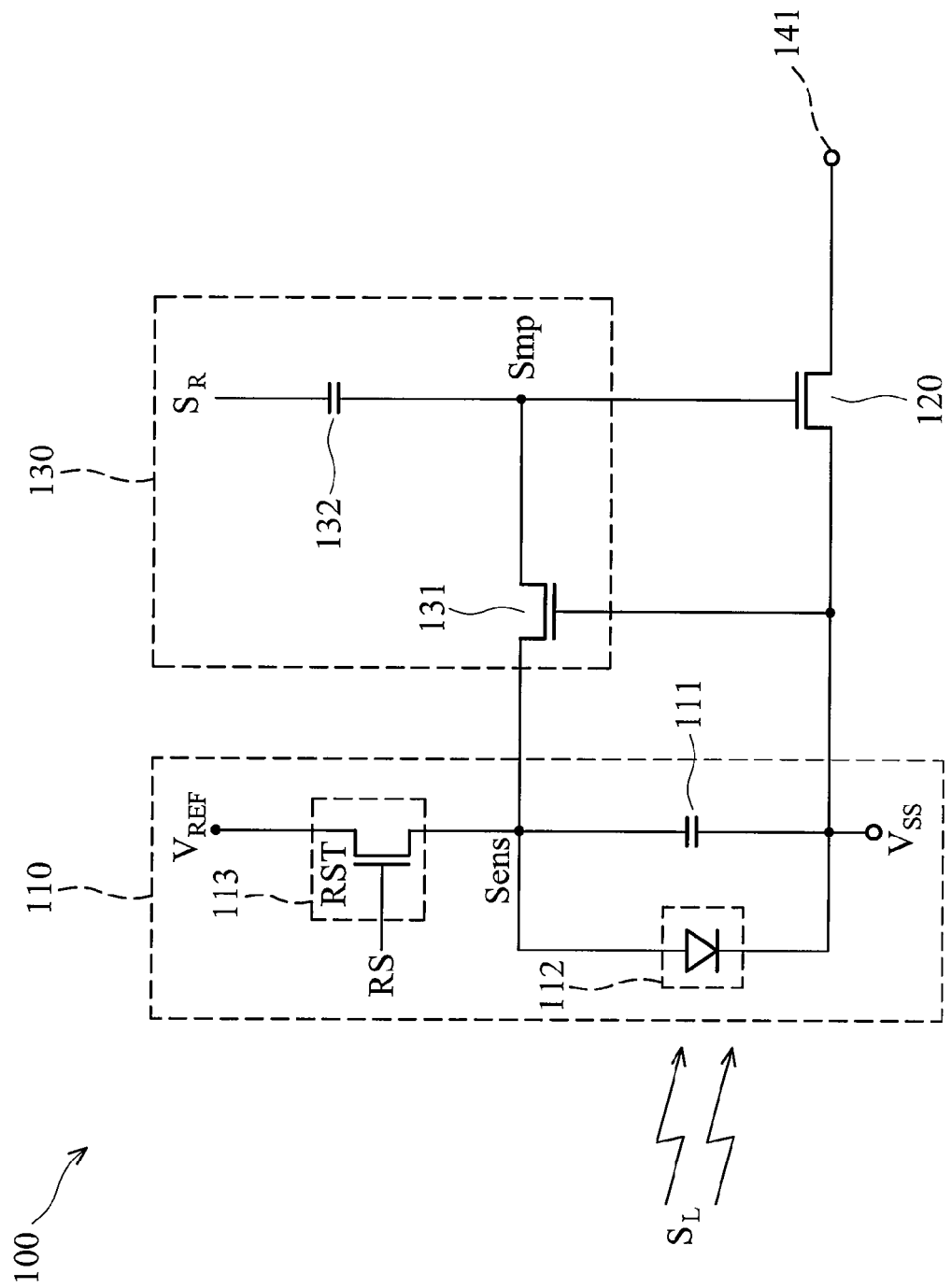
FIG. 1 is a schematic diagram of an exemplary embodiment of a reading circuit.

FIG. 1 is a schematic diagram of an exemplary embodiment of a reading circuit. Reading circuit 100 can comprise a detection module 110, a transistor 120, and a compensation module 130 for obtaining intensity of a light. Detection module 110 detects the intensity of a light $S_L$. Transistor 120 transforms the detection result provided by detection module 110 and provides the transformation result to the output terminal 141. In this embodiment, the transistor 120 comprises a drain coupled to constant voltage $V_{ss}$ and a source coupled to an output terminal 141. Compensation module 130 compensates the threshold voltage of transistor 120. After the threshold voltage of transistor 120 is compensated, compensation module 130 provides the detection result to the first transistor Compensation module 130 comprises a transistor 131. Transistor 131 comprises a gate coupled to the drain of transistor 120, a source coupled to the gate of transistor 120, and a drain coupled to detection module 110. In this embodiment, the compensation module 130 further comprises a capacitor 132 coupled between the gate of transistor 120 and a reading signal $S_R$. Because the position of transistor 131 is near transistor 120, the threshold voltages of transistors 120 and 131 are the same.

Detection module 110 comprises capacitor 111, photo sensor 112, and a switch 113. Photo sensor 112 is connected to capacitor 111 in parallel. Switch 113 is serially connected to capacitor 111 between a reference voltage $V_{REF}$ and a grounding voltage $V_{ss}$. When a starting signal RS is received by switch 113, photo sensor 112 receives the reference voltage $V_{REF}$, thus, photo sensor 112 starts detecting the intensity of the light and storing the detection result to capacitor 111. Photo sensor 112 can be a photo diode produced by a low temperature poly-Si (LTPS) technique. The photo diode comprises a cathode coupled to constant voltage $V_{ss}$.

In this embodiment, switch 113 can be a transistor RST. Transistor RST comprises a gate receiving the starting signal RS, a drain receiving the reference voltage $V_{REF}$, and a source coupled to an anode of the photo diode. In some embodiments, the drain of transistor RST receives the reading signal $S_R$.

When the starting signal RS is activated, photo sensor 112 detects the intensity of the light $S_L$ and stores the detection result to capacitor 111. After the reading signal $S_R$ is activated, voltages of points Sens and Smp are increased. When the voltage of point Sens exceeds the threshold voltage of transistor 131, transistor 131 is turned off. At this time, the voltage of point Smp is continuously increased to turn on transistor 120. When transistor 120 is turned on, the voltage stored in capacitor 111 is transformed to provide a current signal to the output terminal 141.

For example, assume due to manufacturing procedures, the transistors in different circuits for transforming the detection results have different threshold voltages. By utilizing difference of capacitance coupling voltage on point Smp between turn-off and turn-on of transistor 131, the threshold voltages of the transistors are compensated. Thus, the transistors provide the same transformation result to output terminals when the lights detected by circuits have the same intensity.

Figure 2:
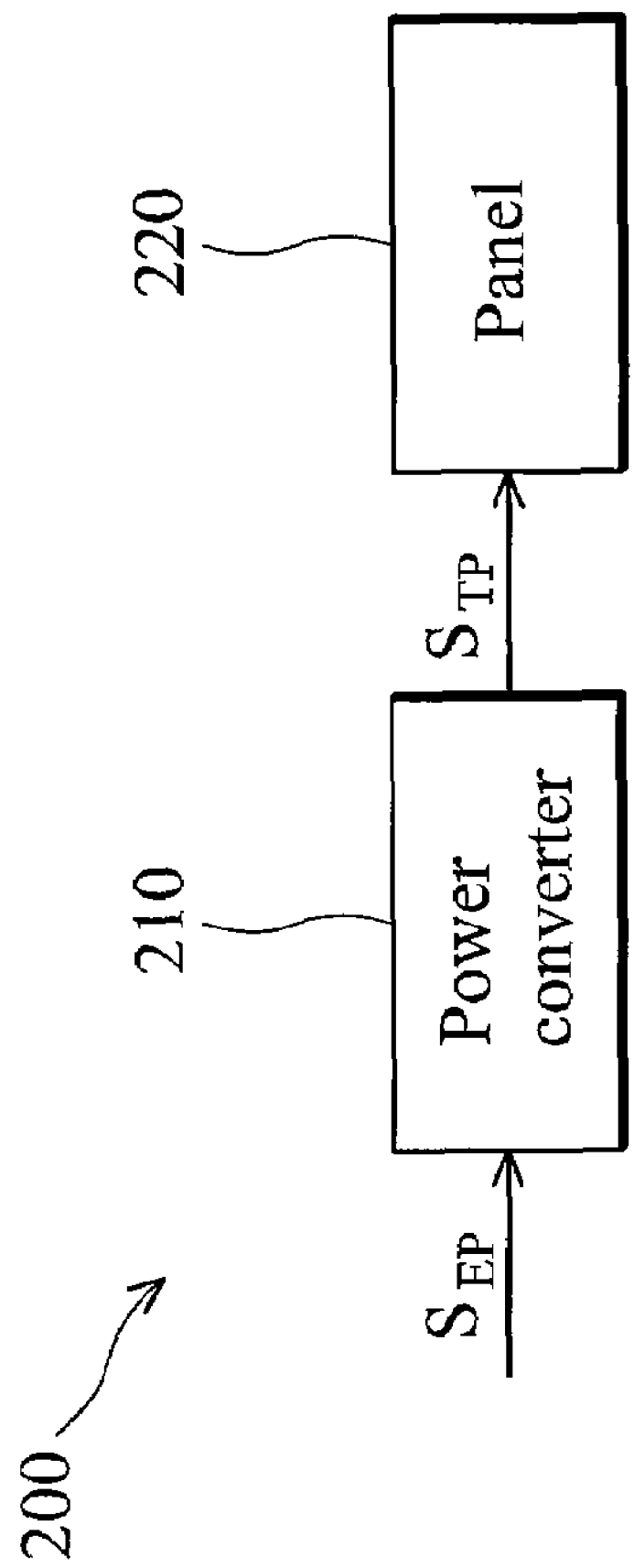
FIG. 2 is a schematic diagram of an exemplary embodiment of an electronic system.

Reading circuit 100 shown in FIG. 1 is applied in different applications for obtaining the intensity of a light. A display panel having a touch function capability is given as an example in the following, but the invention is not limited to the described. FIG. 2 is a schematic diagram of an exemplary embodiment of an electronic system. Electronic system 200 can be a personal digital assistant (PDA), a notebook computer (NB), a personal computer (PC), digital camera, car display, global positioning system (GPS), avionics display or a mobile phone. Electronic system 200 can comprise a power converter 210 and a display panel 220. Power converter 210 transforms an external power signal $S_{EP}$ to generate a transforming signal $S_{TP}$. Display panel 220 with the touch function receives the transforming signal $S_{TP}$, and displays an image. In this embodiment, the transforming signal $S_{TP}$ serves as the reference signal $V_{REF}$. In one embodiment, power converter 210 transforms the external power signal $S_{EP}$ from alternating current (AC) to direct current (DC). In another embodiment, power converter 210 transforms the voltage level of the external power signal $S_{EP}$.

Figure 3:
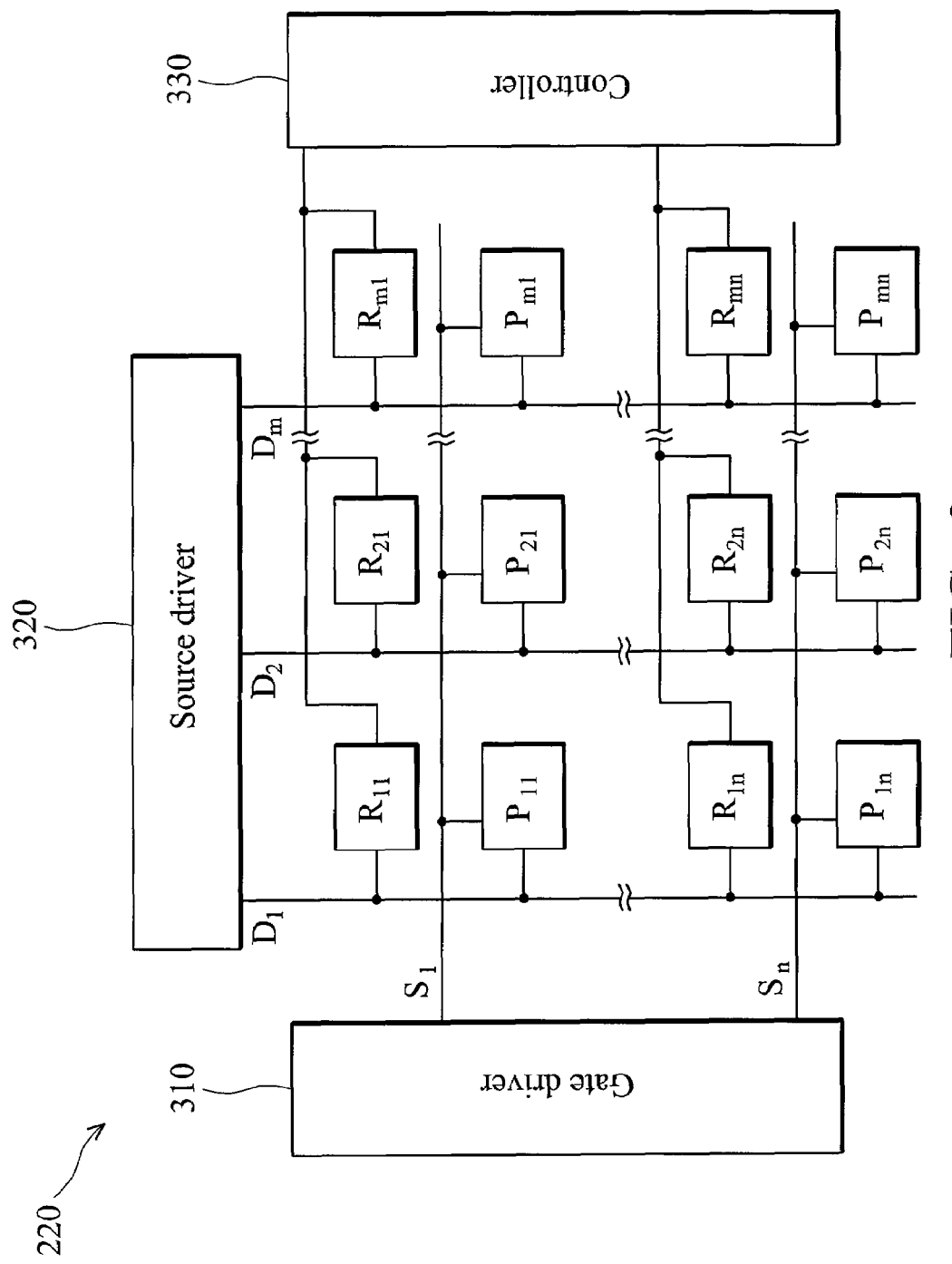
FIG. 3 is a schematic diagram of an exemplary embodiment of a display panel.

FIG. 3 is a schematic diagram of an exemplary embodiment of a display panel. Display panel 220 can comprise a gate driver 310, a source driver 320, a controller 330, pixel units $P_{11} \sim P_{mn}$, and reading circuit $R_{11} \sim R_{mn}$ (such as the reading circuit 100 shown in FIG. 1). Gate driver 310 provides scan signals to scan lines $S_1 \sim S_n$. Source driver 320 provides data signals to data lines $D_1 \sim D_m$. Pixel units $P_{11} \sim P_{mn}$ receive the scan signals and the data signals for displaying an image. In this embodiment, each pixel unit only displays one color, such as a red color, a green color, a blue color or a white color. In some embodiment, each pixel unit can comprise a plurality of sub-pixels. Each sub-pixel displays one color. For example, the pixel unit $P_{11}$, comprises four sub-pixels for displaying a red color, a green color, a blue color and a white color.

Additionally, since reading circuit $R_{11} \sim R_{mn}$ respectively approach pixel units $P_{11} \sim P_{mn}$, when light illuminate the pixel units $P_{11} \sim P_{mn}$, reading circuit $R_{11} \sim R_{mn}$ detects intensity of the light according to a control signal group provided by controller 330. For example, when light illuminates the pixel unit $P_{11}$, reading circuit $R_{11}$ detects intensity of the light according to a control signal group provided by controller 330. Transistors in the reading circuit $R_{11} \sim R_{mn}$ transform the detection result and provide the transformation result to data lines $D_1 \sim D_m$.

The control signal group provided by controller 330 comprises the reference voltage $V_{REF}$, the grounding voltage $V_{SS}$, the starting signal RS, and the reading signal $S_R$ shown in FIG. 1. When the output terminal 141 shown in FIG. 1 is coupled to the corresponding data line, the transformation result is provided to the data line.

Figure 4:
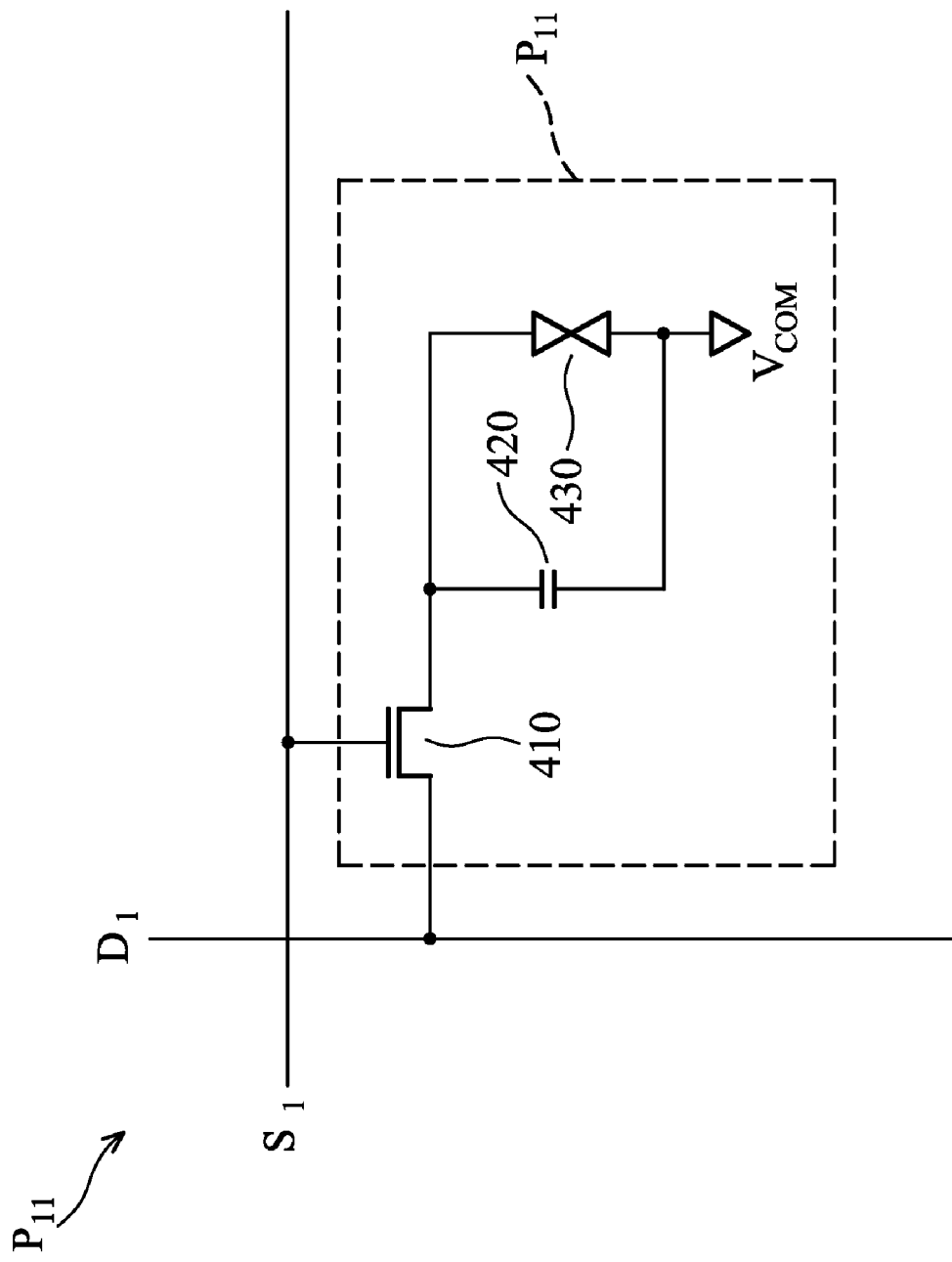
FIG. 4 is a schematic diagram of an exemplary embodiment of a pixel unit.

FIG. 4 is a schematic diagram of an exemplary embodiment of a pixel unit. Because the operation of pixel units $P_{11} \sim P_{mn}$ is the same, pixel unit $P_{11}$ is provided as An example. Pixel unit $P_{11}$ comprises a driving transistor 410, a storage capacitor 420, and a liquid crystal capacitor 430. Driving transistor 410 comprises a gate coupled to scan line $S_1$ and a drain coupled to data line $D_1$. Storage capacitor 420 is connected to liquid crystal capacitor 430 in parallel between the source of driving transistor 410 and a common voltage $V_{COM}$.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A reading circuit, comprising:
   a detection module detecting a light;
   a first transistor transforming the detection result for generating a current signal; and
   a compensation module compensating a threshold voltage of the first transistor and comprising a second transistor comprising a gate directly connected to a drain of the first transistor, a source directly connected to a gate of the first transistor, and a drain directly connected to the detection module.

2. The reading circuit as claimed in claim 1, wherein the compensation module further comprises a first capacitor coupled between the gate of the first transistor and a reading signal.

3. The reading circuit as claimed in claim 2, wherein the drain of the first transistor is coupled to a constant voltage and the source of the first transistor provides an output current corresponding to the intensity of the light.

4. The reading circuit as claimed in claim 2, wherein the detection module comprises:
   a second capacitor;
   a photo sensor connected to the second capacitor in parallel, wherein the photo sensor detects the intensity of the light and stores the detection result to the second capacitor when a reference signal is received by the photo sensor; and
   a switch providing the reference signal.

5. The reading circuit as claimed in claim 4, wherein the photo sensor is a photo diode comprising a cathode coupled to a constant voltage and an anode coupled to the drain of the second transistor.

6. The reading circuit as claimed in claim 5, wherein the photo diode is produced by a low temperature poly-Si (LTPS) technique.

7. The reading circuit as claimed in claim 5, wherein the switch is a third transistor comprising a gate receiving a starting signal, a drain receiving the reference signal, and a source coupled to the anode of the photo diode.

8. The reading circuit as claimed in claim 7, wherein the reference signal and the reading signal are the same.

9. The reading circuit as claimed in claim 1, wherein the compensation module provides the detection result to the first transistor after the threshold voltage of the first transistor is compensated.

10. A display panel, comprising:
    a pixel unit coupled to a data line and a scan line; and
    a circuit as claimed in claim 1 for generating a current signal to the data line.

11. An electronic system, comprising:
    a display panel as claimed in claim 10; and
    a power converter providing a transforming signal to the display panel.

12. The electronic system as claimed in claim 11, wherein the pixel unit comprises:
    a driving transistor comprising a gate coupled to the scan line and a drain coupled to the data line; and
    a storage capacitor coupled between a source of the driving transistor and a common voltage.

13. The electronic system as claimed in claim 11, wherein the electronic system is a personal digital assistant (PDA), a notebook computer (NB), a personal computer (PC), digital camera, car display, global positioning system (GPS), avionics display or a mobile phone.

14. The electronic system as claimed in claim 11, wherein the pixel unit displays a red color, a green color, a blue color or a white color.

15. The electronic system as claimed in claim 11, wherein the pixel unit comprises a plurality of sub-pixels, each sub-pixel displaying a red color, a green color, a blue color or a white color.

* * * * *